United States Patent
Manolakos et al.

(10) Patent No.: US 10,938,539 B2
(45) Date of Patent: Mar. 2, 2021

(54) UE-ASSISTED PHYSICAL RESOURCE BLOCK GROUP (PRG) CONFIGURATION AND SIGNALING

(71) Applicant: QUALCOMM INCORPORATED, San Diego, CA (US)

(72) Inventors: Alexandros Manolakos, San Diego, CA (US); Chao Wei, Beijing (CN); Pavan Kumar Vitthaladevuni, San Diego, CA (US); Yu Zhang, Beijing (CN); Hao Xu, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/343,538

(22) PCT Filed: Nov. 3, 2017

(86) PCT No.: PCT/CN2017/109250
§ 371 (c)(1),
(2) Date: Apr. 19, 2019

(87) PCT Pub. No.: WO2018/082640
PCT Pub. Date: May 11, 2018

(65) Prior Publication Data
US 2020/0052866 A1   Feb. 13, 2020

Related U.S. Application Data

(63) Continuation of application No. PCT/CN2016/104562, filed on Nov. 4, 2016.

(51) Int. Cl.
*H04L 5/00* (2006.01)
*H04L 25/02* (2006.01)
*H04B 7/06* (2006.01)
*H04W 72/12* (2009.01)

(52) U.S. Cl.
CPC ......... *H04L 5/0092* (2013.01); *H04B 7/0626* (2013.01); *H04L 5/0023* (2013.01); *H04L 25/0222* (2013.01); *H04W 72/1278* (2013.01)

(58) Field of Classification Search
CPC .......................... H04L 5/0092; H04L 5/0023
See application file for complete search history.

(56) References Cited

U.S. PATENT DOCUMENTS

2014/0348012 A1   11/2014   Wu

FOREIGN PATENT DOCUMENTS

| CN | 102316581 A | 1/2012 |
|----|-------------|--------|
| CN | 102860070 A | 1/2013 |
| CN | 104735691 A | 6/2015 |
| WO | 2013139307 A1 | 9/2013 |

(Continued)

OTHER PUBLICATIONS

International Search Report and Written Opinion for PCT/CN2017/109250, dated Jan. 30, 2018.

(Continued)

*Primary Examiner* — Angel T Brockman
(74) *Attorney, Agent, or Firm* — Patterson + Sheridan, L.L.P.

(57) ABSTRACT

Certain aspects of the present disclosure relate to methods and apparatus for a UE to flexibly indicate a preferred precoding resource block group (PRG) size to a base station (e.g., an eNB).

26 Claims, 10 Drawing Sheets

(56) References Cited

FOREIGN PATENT DOCUMENTS

WO    WO-2014208940 A1    12/2014
WO       2016163841 A1    10/2016

OTHER PUBLICATIONS

Huawei, "Hisilicon PRB Bundling Size for DL Data Precoding," 3GPP TSG RAN WFI Meeting #88bis R1-1705074-07, Apr. 4, 2017. Part 2 and 3.
Huawei, "Hisilicon PRB Bundling Size for DL Data Precoding," 3GPP TSG RAN WFI Meeting #89bis R1-1708133-19, May 19. 2017. Part 1, 2 and 3.
Internationalsearch Report and Written Opinion—PCT/CN2016/104562—ISA/EPO—Jul. 28, 2017.
Ericsson: "Details of Semi-Open Loop Transmission", 3GPP Draft, 3GPP TSG-RAN WG1 #86bis, R1-1609861 Details of Semi-Open Loop Transmission, 3RD Generation Partnership Project (3GPP), Mobile Competence Centre, 550, Route Des Lucioles, F-06921 Sophia-Antipolis Cedex, France, vol. RAN WG1, No. Lisbon, Portugal, Oct. 10, 2016-Oct. 14, 2016 Oct. 9, 2016 (Oct. 9, 2016), XP051149888, 3 Pages, Retrieved from the Internet: URL:http://www.3gpp.org/ftp/Meetings_3GPP_SYNC/RAN1/Docs/ [retrieved on Oct. 9, 2016], Section 2.
Ericsson: "On PRB Bundling for NR", 3GPP Draft, 3GPP TSG-RAN WG1 #86bis, R1-1609771 on PRB Bundling, 3RD Generation Partnership Project (3GPP), Mobile Competence Centre, 650, Route Des Lucioles, F-06921 Sophia-Cedex, France, vol. Ran WG1, No. Lisbon, Portugal, Oct. 10, 2016-Oct. 14, 2016 Oct. 9, 2016 (Oct. 9, 2016), XP051149801, pp. 1-4, Retrieved from the Internet: URL:http://www.3gpp.org/ftp/Meetings_3GPP_SYNC/RAN1/Docs/ [retrieved on Oct. 9, 2016], Section 3.
Supplementary European Search Report—EP17867720—Search Authority—The Hague—Jun. 25, 2020.

UE-ASSISTED PHYSICAL RESOURCE BLOCK GROUP (PRG) CONFIGURATION AND SIGNALING

CROSS-REFERENCE TO RELATED APPLICATION

This application is a national stage application under 35 U.S.C. 371 of PCT/CN2017/109250, filed Nov. 3, 2017, which claims priority to International Application No. PCT/CN2016/104562, filed Nov. 4, 2016, which are both assigned to the assignee of the present application and are expressly incorporated by reference in their entireties.

FIELD

The present disclosure relates generally to communication systems, and more particularly, to methods and apparatus for a signaling a preferred size of a resource block group (over which a common precoding is assumed).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment. The method generally includes determining a preferred precoding (or physical) resource block group (PRG) size over which the UE can perform channel estimation jointly over all scheduled physical resource blocks (PRBs) within a PRG of that size and communicating with a base station in accordance with the preferred PRG size.

Certain aspects provide a method for wireless communication by a base station. The method generally includes determining a preferred precoding (or physical) resource block group (PRG) size over which a user equipment (UE) can perform channel estimation jointly over all scheduled physical resource blocks (PRBs) within a PRG of that size and communicating with the UE in accordance with the preferred PRG size.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
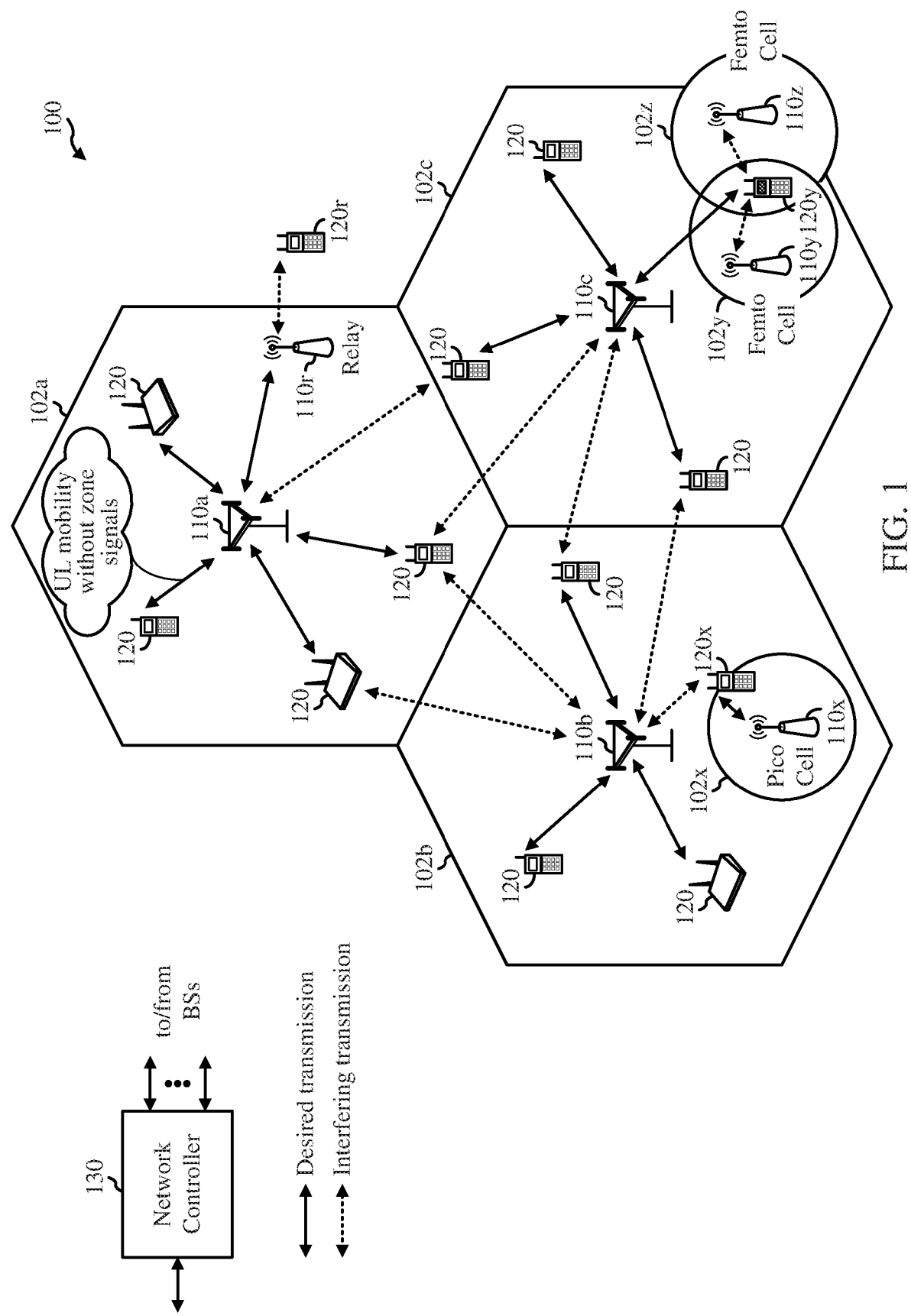
FIG. 1 is a block diagram conceptually illustrating an example telecommunications system, in accordance with certain aspects of the present disclosure.

Aspects of the present disclosure enable a user equipment (UE) to assist a network in optimizing air resource utilization. As will be described in greater detail below, by feeding back a preferred precoding resource block group (PRG) size, a UE may help the network adapt the PRG size parameter to changes in channel conditions experienced at the UE, such as frequency selectivity or signal to noise ratio (SNR).

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

The present disclosure relates generally to communication systems, and more particularly, to methods and apparatus for a signaling a preferred size of a precoding resource block group (PRG). A PRG generally refers to a set of resource blocks over which the UE may assume (or would like) a common precoding to be used.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed, for example, for enabling connectivity sessions and internet protocol (IP) establishment, as described in greater detail below.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to timefrequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
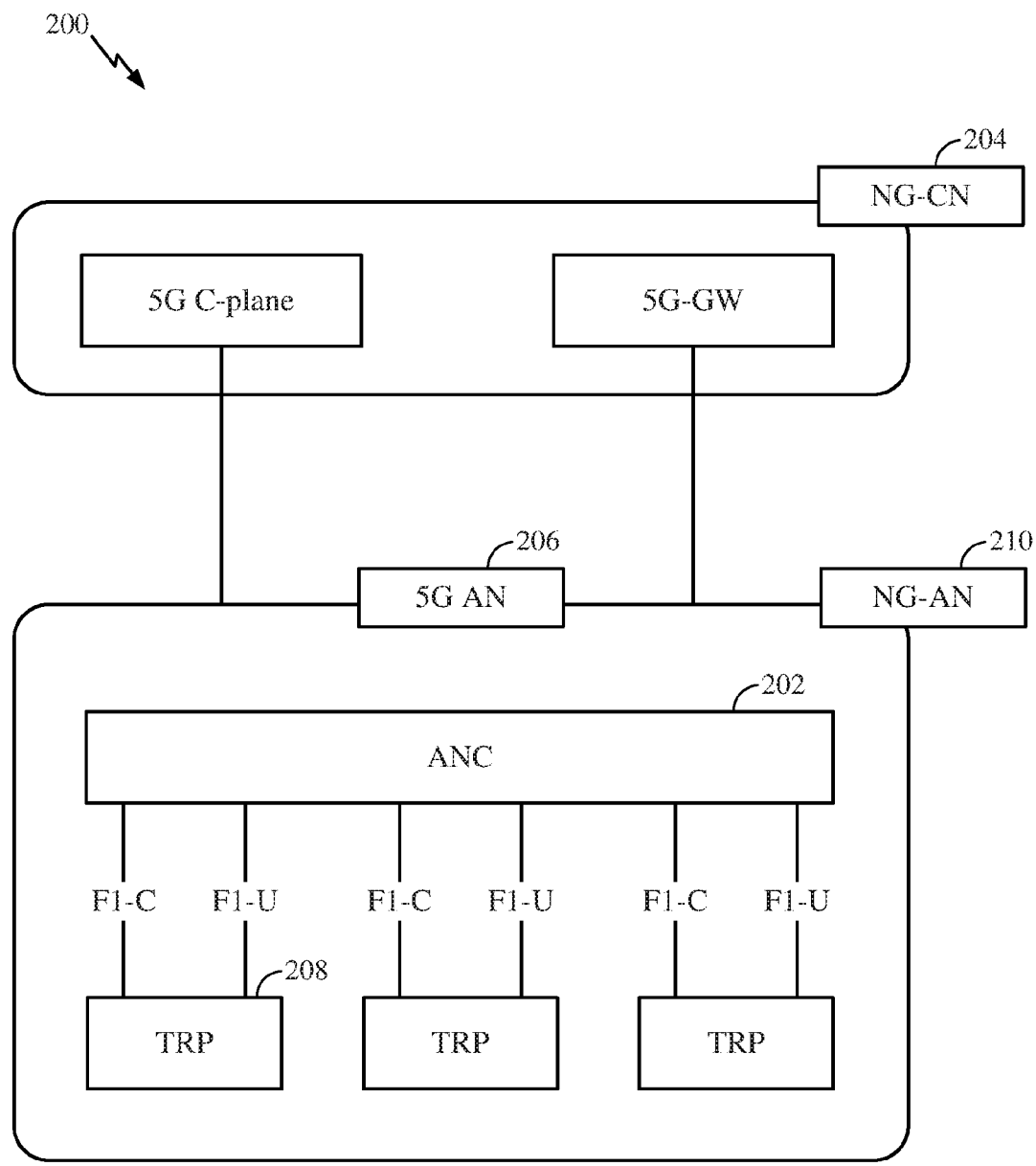
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NB s, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
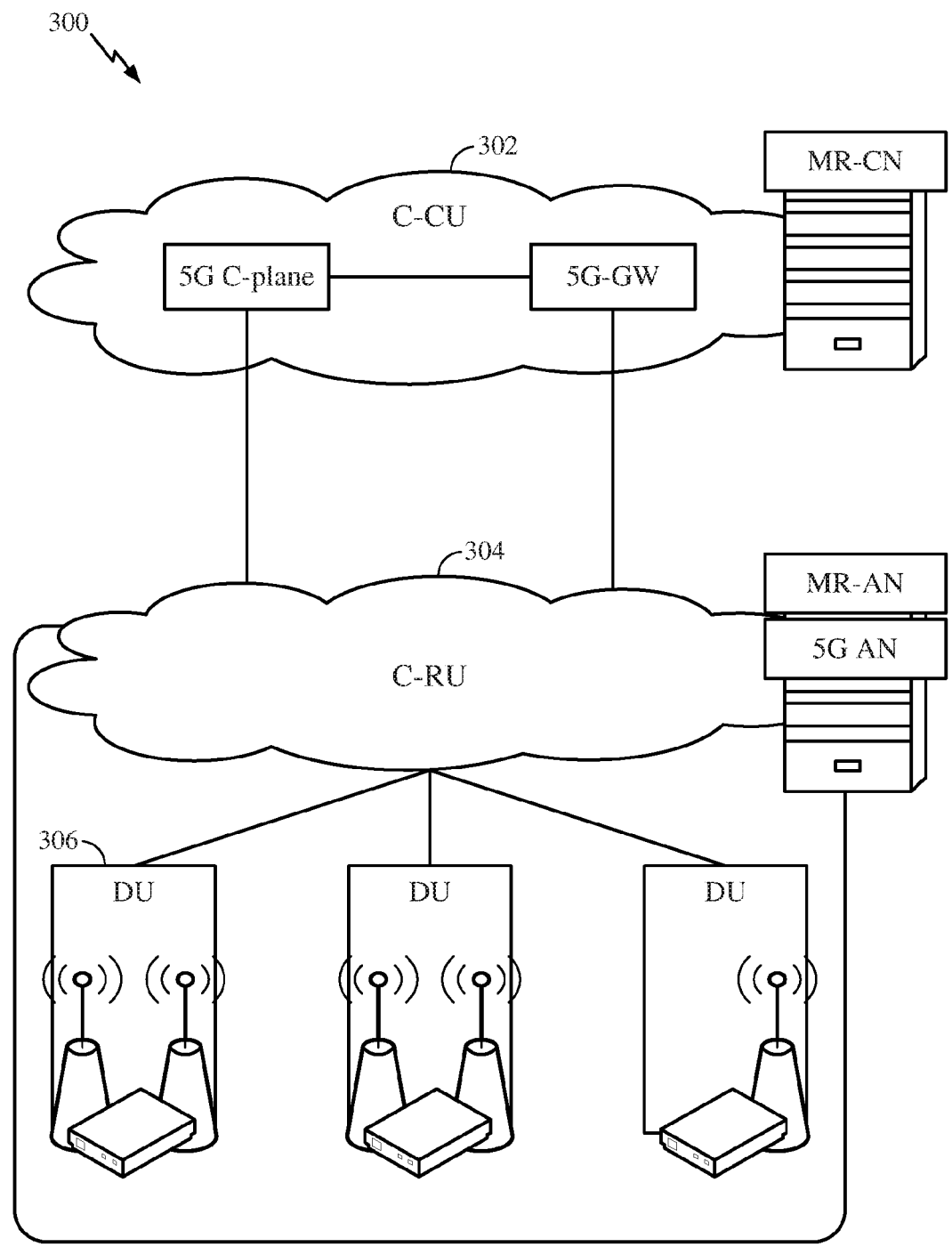
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
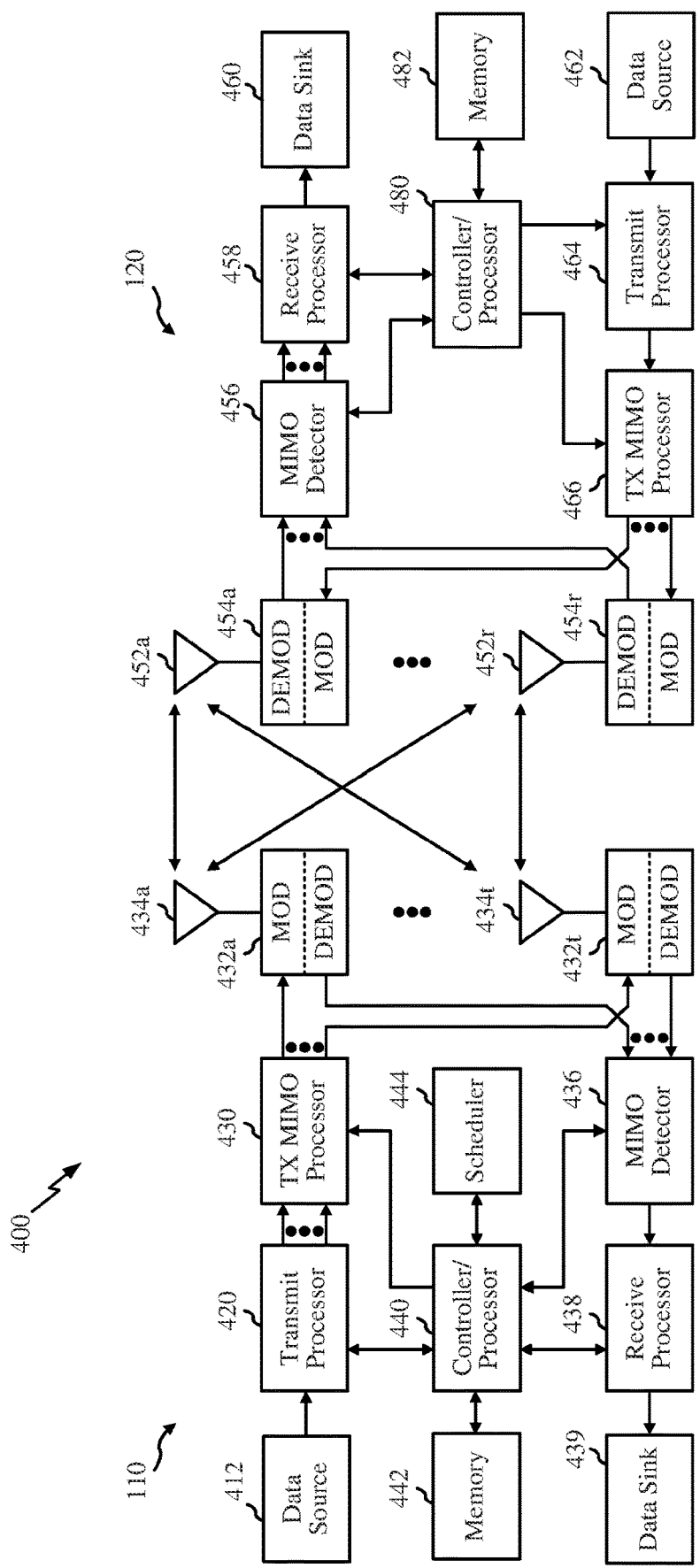
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein.

FIG. 4 shows a block diagram of a design of a BS 110 and a UE 120, which may be one of the BS s and one of the UEs in FIG. 1. For a restricted association scenario, the base station 110 may be the macro BS 110$c$ in FIG. 1, and the UE 120 may be the UE 120$y$. The base station 110 may also be a base station of some other type. The base station 110 may be equipped with antennas 434$a$ through 434$t$, and the UE 120 may be equipped with antennas 452$a$ through 452$r$.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432$a$ through 432$t$. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432$a$ through 432$t$ may be transmitted via the antennas 434$a$ through 434$t$, respectively.

At the UE 120, the antennas 452$a$ through 452$r$ may receive the downlink signals from the base station 110 and may provide received signals to the demodulators (DEMODs) 454$a$ through 454$r$, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454$a$ through 454$r$, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454$a$ through 454$r$ (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in the figures, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
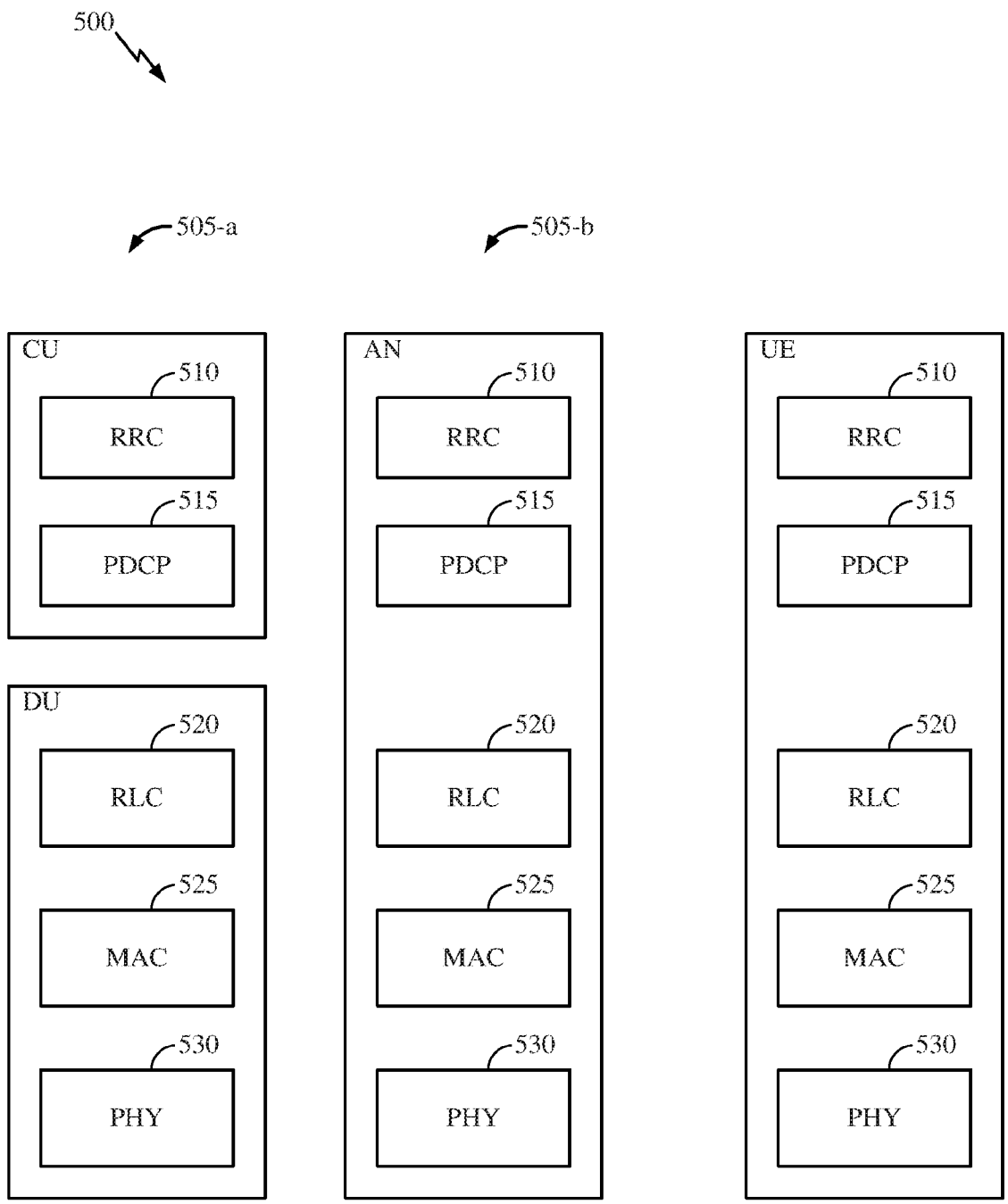
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-$a$ shows a split implementation of a protocol stack, in which implementation of the protocol stack is split between a centralized network access device (e.g., an ANC 202 in FIG. 2) and distributed network access device (e.g., DU 208 in FIG. 2). In the first option 505-$a$, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-$a$ may be useful in a macro cell, micro cell, or pico cell deployment.

A second option 505-$b$ shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
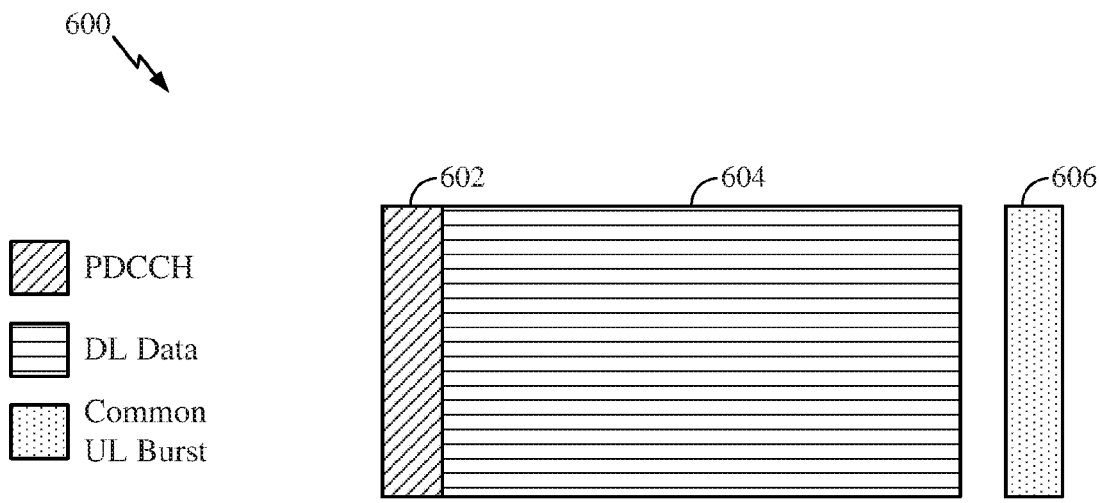
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
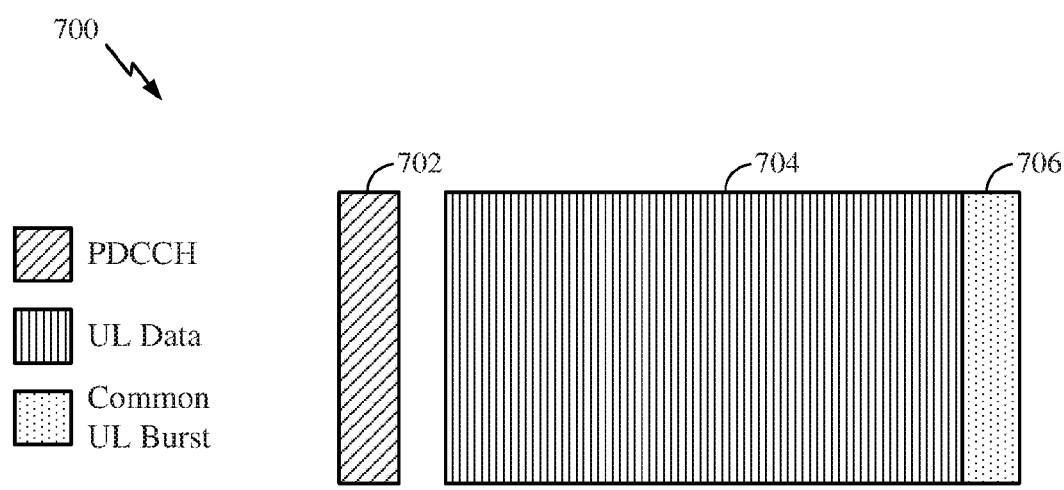
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Techniques for UE-Assisted Physical Resource Block Group (PRG) Configuration and Signaling As noted above, aspects of the present disclosure enable a UE to feed back a preferred precoding resource block group (PRG) size, which may help the network adapt the PRG size parameter to changes in channel conditions. For example, by indicating a smaller PRG size, the base station may design narrowband precoders (and corresponding beams) that will exploit better the frequency selectivity of the channel. On the other hand, if the channel of an antenna port is not frequency selective, the UE may indicate a larger PRG size such that it can efficiently perform channel estimation across a larger band.

Aspects of the present disclosure provide techniques for a UE to feedback (e.g., report to a serving base eNB) a preferred PRG size. The UE may indicate the preferred PRG size, for example, as an integer that specified number of RBs, or even the whole scheduled BW. The PRG indication may be provided as part of the CSI reporting (e.g., per CSI process) to handle various scenarios, such as coordinated multipoint (CoMP), where different CSI hypotheses would lead to different best options for PRG.

Figure 8:
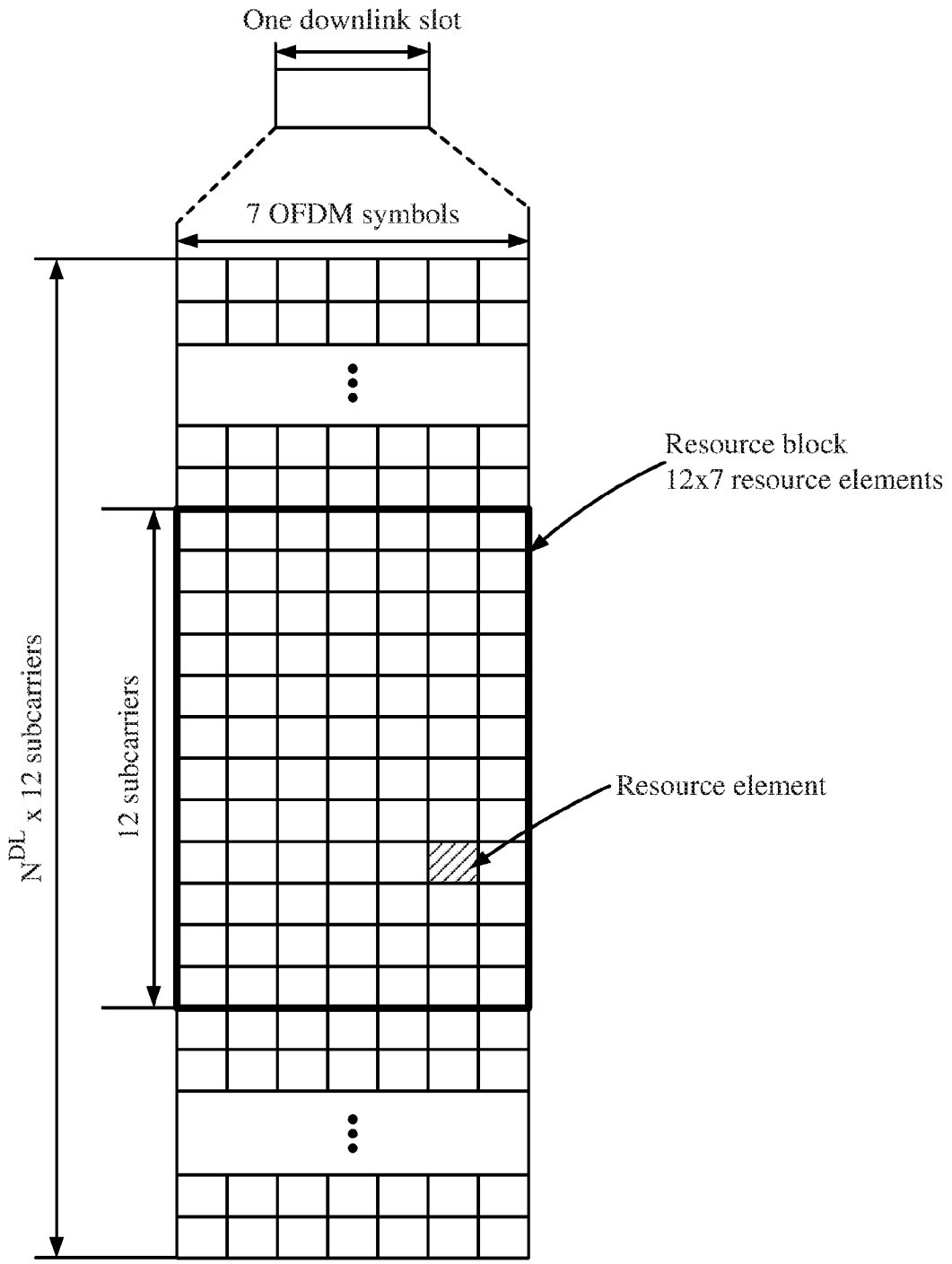
FIG. 8 illustrates an example diagram of a resource block, in accordance with certain aspects of the present disclosure.

As noted above, 5G New Radio (NR) will be deployed in large bandwidths using OFDM in the downlink. As illustrated in FIG. 8, which shows an example PRB, the time-frequency grid is split in resource elements (REs). An RE, which is 1 subcarrier×1 symbol, is typically the smallest discrete part of the time-frequency grid and may contain a single complex value representing data from a physical channel or signal.

A physical resource block (PRB) generally refers to the smallest unit of resources that can be allocated to a user. As illustrated in FIG. 8, an RB generally refers to a set of $N_{RB}$ subcarriers over $N_{DL}$ symbols ($N_{RB} \times N_{DL}$ REs).

The term precoding RB group (PRG) generally refers to a set of consecutive RBs in which the UE may assume (or may prefer) that the same receiving precoder can be applied on all scheduled PRBs within a PRG.

The size of the PRG depends on system bandwidth in LTE. When a UE is configured for operation in transmission mode 9 in LTE, it may assume that the precoding granularity is multiple resource blocks in the frequency-domain. The demodulation reference signals (DMRS) are precoded in the same way for the scheduled RBs that belong in the same PRG. This may help for channel estimation, since the UE can assume that the same precoder is used in a longer bandwidth and may therefore "average-out" the noise.

Figure 9:
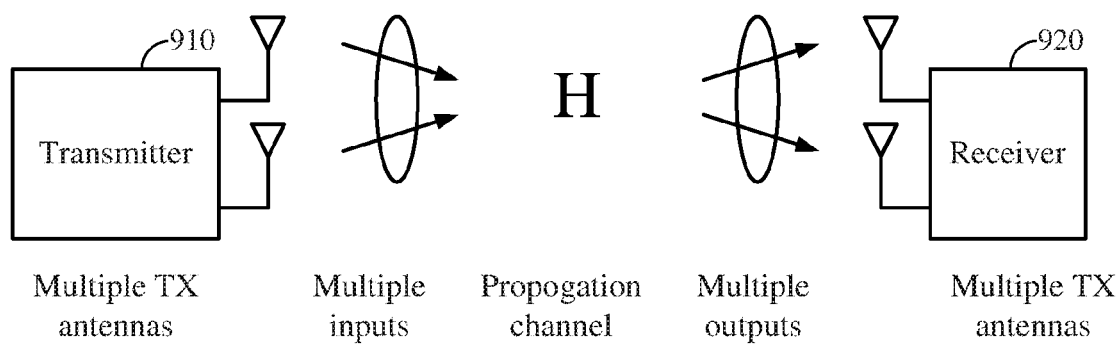
FIG. 9 illustrates an example diagram of a multiple input multiple output (MIMO) transmission.

For example, for a MIMO transmission sent according to channel model shown in FIG. 9, a receiver 920 (e.g., a UE) may be able to assume a transmitter 910 (e.g., a serving eNB) applied a same precoder, corresponding to transmit vector x, for all PRBs, within a PRG, scheduled for receiver 910. Precoding generally refers to processing at the transmitter, such that multiple data streams are sent from multiple transmit antennas with independent and appropriate weightings to achieve a desired result (e.g., optimizing link throughput and/or mitigating interference at the receiver or other devices). By feeding back a preferred choice of the PRG size, receiver 920 may help optimize PRG size selection, for example, based on observed channel conditions.

Figure 10:
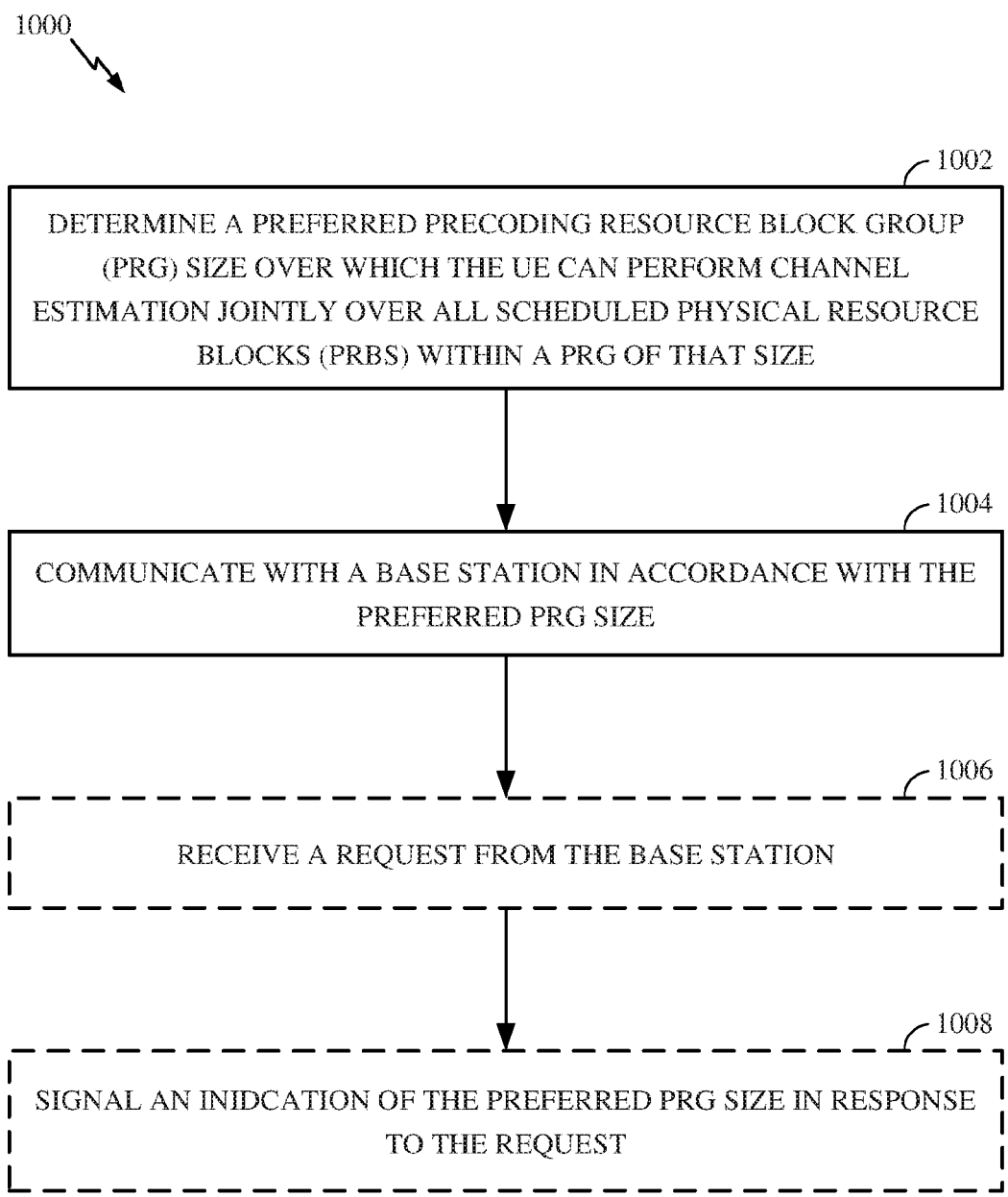
FIG. 10 illustrates example operations for wireless communications by a user equipment, in accordance with certain aspects of the present disclosure.

FIG. 10 illustrates example operations 1000 for indicating a preferred PRG size by a UE, in accordance with certain aspects of the present disclosure. Operations 1000 may be performed, for example, by a UE 120 shown in FIG. 1.

Operations 1000 begin, at 1002, by determining a preferred precoding resource block group (PRG) size over which the UE can perform channel estimation jointly over all scheduled physical resource blocks (PRBs) within a PRG of that size. At 1004, the UE communicates with a base station in accordance with the preferred PRG size. The UE may communicate (provide an indication of) the preferred PRG size to the base station. In some cases, the indication may be provided in response to a request from the base station. In such cases, at 1006, the UE receives a request from the base station and, at 1008, the UE signals the preferred PRG Size in response to the request.

Figure 11:
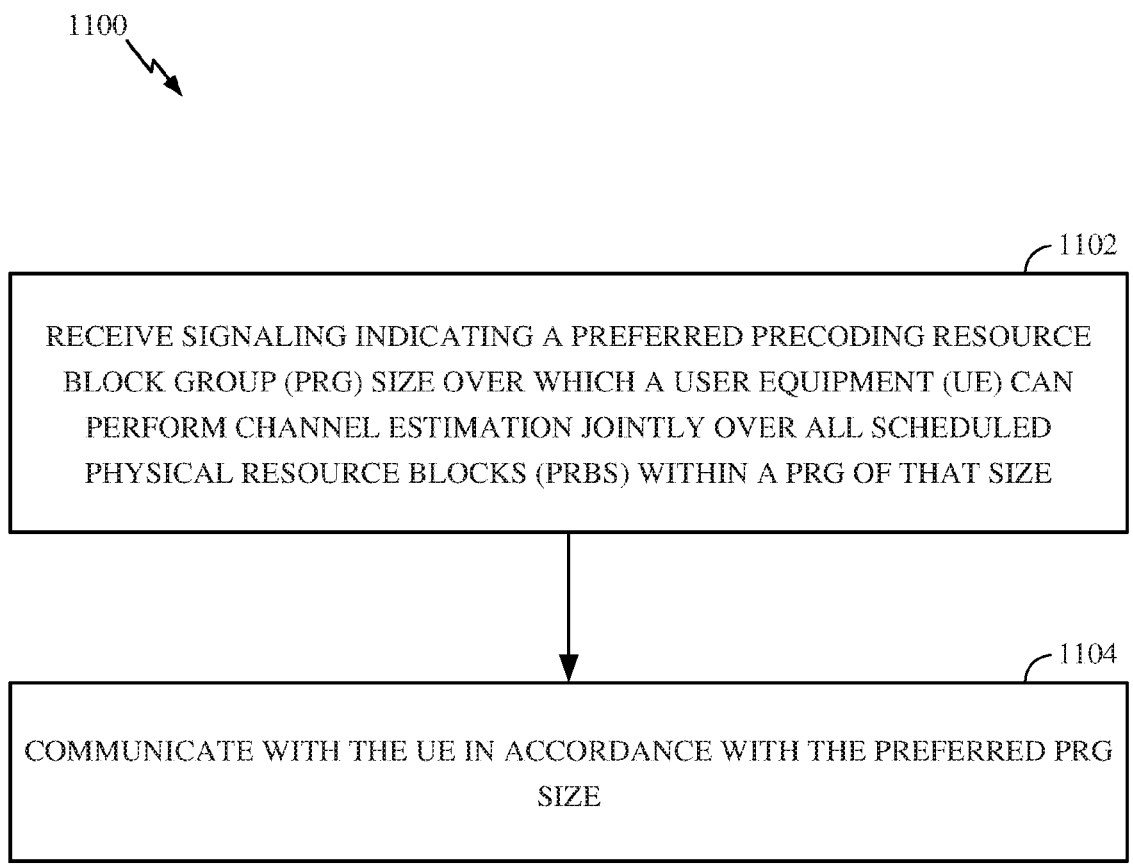
FIG. 11 illustrates example operations for wireless communications by a base station, in accordance with certain aspects of the present disclosure.

FIG. 11 illustrates example operations 1100 for processing a preferred PRG size by a base station, in accordance with certain aspects of the present disclosure. The (BS-side) operations 1100 may be considered complementary to (UE-side) operations 1000.

Operations 1100 begin, at 1102, by receiving signaling indicating a preferred precoding resource block group (PRG) size over which the UE can perform channel estimation jointly over all scheduled physical resource blocks (PRBs) within a PRG of that size. At 1104, the BS communicates with the UE in accordance with the preferred PRG size. As noted above, the base station may optionally, at 1106, the base station sends a request to the UE and, at 1108, receives an indication of the preferred PRG Size in response to the request. In some cases, the BS may provide an indication to the UE of the PRG supported. For example, an implicit indication may be provided (e.g., assuming a preferred PRG size will be used unless otherwise indicated) or a gNB may provide an explicit dynamic indication on the DL that signals the PRG that is supported.

In general, the PRG size signals that the UE can perform channel estimation jointly across this set of PRBs. Once a base station determines this preferred PRG size, it may process transmissions accordingly. As one example, the BS may apply a same precoder in all the subcarriers inside the PRBs (within a PRG), but the BS may apply other processing techniques once learning of the preferred PRG size.

As described herein, the UE may provide (signal) an indication or the preferred PRG size to the BS (e.g., an eNB). In some cases, this information may be derived based on one or a combination of the antenna port frequency selectivity, delay spread, geometry, or other channel properties.

In general, the preferred PRG size may be inversely proportional to frequency selectivity of a channel. For example, if the channel of an antenna port is very frequency selective and the SNR is good, then the UE may ask for a smaller PRG size, resulting in finer granularity in channel estimates, so that the base station can design narrowband precoder configurations (corresponding to focused beams) that will better exploit the frequency selectivity of the channel. If, on the other hand, the channel of an antenna port is less frequency selective, the UE may ask for a larger PRG size, which will allow the UE to perform channel estimation across a larger band.

Indicating a preferred PRG size does not necessarily mean that the same precoder needs to be constant across all PRBs. In some cases, the preferred PRG size may essentially indicate that the UE would prefer to do the channel estimation across all the PRB s that belong in the PRG. This approach may allow for precoding designs in which the precoder settings change, but "slowly" or "continuously" possibly in phase and amplitude between consecutive subcarriers.

In some cases, the UE may report the preferred PRG size using an element referred to as a PRG indication (PRGI). A PRGI could be provided, for example, as part of the CSI reporting mechanism. In LTE, a CSI process generally involves a CSI Reference Signal (CSI-RS) resource, a CSI interference Measurement (CSI-IM) resource, and a reporting mechanism. Regarding the reporting mechanism, the UE may be configured to report the following CSI indicators as requested by the network: Channel Quality Indicator (CQI), Rank Indicator (RI), Precoder Matrix Indicator (PMI). In some cases, the UE may also include a PRGI in the CSI report, for example, as an additional CSI indicator that can be requested by the network (as part of the CSI configuration). As such, CSI configuration options may be applied to the PRGI. For example, PRGI may be reported on a wideband basis or per sub-band basis, periodically, aperiodically, or semi-statically (e.g., as specified in the request).

Allowing a UE to indicate PRGI via a CSI report may be particular useful in CoMP scenarios. For example, in a CoMP scenario, a CSI process may be configured together with a specific hypothesis (e.g., where the UE reports the CSI under the hypothesis that two eNBs transmit concurrently). For each hypothesis, and thus for each CSI process, the best (e.g., optimal) value of PRG may be different. The UE may, thus, select a PRGI value to indicate via the CSI report, depending on the hypothesis.

In some cases, rather than report one PRGI per CSI process, one PRGI may be determined and reported per layer. For example, the UE may report back the PMI, and also reports the PRGI for each of the layers. This may provide additional flexibility, as different layers may have different determined PRGI values.

As noted above, PRGI may be indicated as an integer value in some cases. For example, PRGI values may be selected from a predefined set of numbers (such as 1, 2, 3, 4, 8 PRBs). In some cases, the UE may signal an index that indicates a number in such a set (e.g., a 2 bit PRGI value may be used to indicate one of 4 numbers in a set). The set of numbers could be predefined or signaled (e.g., semi-statically configured). In some cases, rather than signal an actual numeric value, the UE may signal an indication that the preferred PRG size is to cover all the scheduled PRB s.

In some cases, a UE may derive the preferred PRG size during the CSI acquisition phase. In other words, even though the UE may not know what will be the scheduled PRBs in the future, the UE may still ask the BS to use a precoding method that allows the UE to assume that it can perform channel estimation in the whole scheduled allocation (regardless of what that is).

Similarly, in some cases, a UE may signal that the preferred PRG size is as much as allowed by a predefined set of rules, algorithm, or PRB schedules (e.g., that depends on the size of the scheduled PRBs). In such a scenario, a set of predefined rules may be agreed upon between the UE and eNB, for example, that define how the number of scheduled PRBs are mapped to a preferred PRG size value indicated by a UE. In cases where the number of scheduled PRBs maps to the preferred PRG size, the UE may signal that it wants an indicated PRG size in an upcoming transmission, or set of transmissions, that follows the agreed upon set of rules.

One example rule may specify that, when the PRG size is a fixed number, this should be equal to the resource block group (RBG) size, which corresponds to the minimum number of PRBs that are scheduled to the UE. For example, if RBG is 4, then the base station may not schedule fewer than 4 consecutive PRBs to the UE. According to this example rule, this rule would effectively mean PRG size should be equal to the RBG size. As a result, when or if the RBG size changes, then the PRG size would change accordingly.

In some cases, a UE can use the PRGI to signal a preferred granularity of CSI reporting to the eNB. In other words, by sending a PRGI, the UE may signal to the eNB that it wants to perform CE every PRGI RBs and to report back one RI/PMI/CQI for each PRG. In such cases, the UE and the eNB may agree with additional signaling (negotiate) whether this type of coupling is active or not.

In cases where a PRGI value indicates all scheduled PRBs, then the UE may report back only one RI/PMI/CQI for all the scheduled PRBs, regardless of how many PRBs are actually scheduled.

Other methods of CSI feedback (such as time-domain channel quantization) may also be used when a preferred PRGI value indicates that all the scheduled PRBs belong in the same PRG.

In some cases, the preferred PRG size may be dependent on a partial-band size a UE is configured to operate on. This approach may be appropriate in the cases of partial-band CSI-RS and SRS configurations. In such cases, a UE may be configured to operate on only a partial-band (e.g., a 20 MHz partial-band), instead of the whole system bandwidth (e.g., 80 MHz).

In some cases, the preferred PRG size indicated by a UE may be dependent on the numerology a UE is configured to communicate with. As used herein, the term numerology generally refers to parameters such as cyclic prefix (CP) length and subcarrier spacing (SCS). Numerology-based PRG size determination may be desirable as the benefit of PRB bundling may depend on the subcarrier spacing and the number of RBs to be bundled.

As described herein, aspects of the present disclosure enable a UE to feed back a preferred PRG size, which may help the network adapt the PRG size parameter to changes in channel conditions. For example, by using smaller PRG sizes, high frequency selectivity may be exploited, while using a larger PRG size in low frequency selectivity conditions may allow the UE to perform channel estimation across a larger band.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c)

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in the figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   determining a preferred precoding resource block group (PRG) size over which the UE can perform channel estimation jointly over all scheduled physical resource blocks (PRBs) within a PRG of that size;
   providing an indication of the preferred PRG size to the base station; and
   communicating with a base station in accordance with the preferred PRG size.

2. The method of claim 1, wherein the indication comprises at least one of:
   an integer value of the preferred PRG size; or
   an indication of one of a set of PRG size values.

3. The method of claim 1, wherein:
   a number of PRBs are scheduled for a transmission from the base station to the UE; and
   a value of the indication indicates the preferred PRG size corresponds to all scheduled PRBs.

4. The method of claim 1, wherein the indication is provided in a channel state information (CSI) report.

5. The method of claim 4, wherein an indication of a preferred PRG size is provided per CSI process or per layer.

6. The method of claim 1, further comprising providing an indication of a preferred granularity for CSI reporting.

7. The method of claim 1, wherein the preferred PRG size is determined based on one or more channel properties.

8. The method of claim 1, wherein the one or more channel properties comprise antenna port frequency selectivity.

9. The method of claim 1, wherein a preferred PRG size is signaled periodically.

10. The method of claim 1, wherein a preferred PRG size is signaled in response to a request from a base station.

11. The method of claim 10, wherein the request indicates whether the preferred PRG size is to be based on wideband or a narrowband.

12. The method of claim 10, wherein the request semi-statically schedules the UE to report preferred PRG sizes.

13. The method of claim 1, wherein the PRG size is determined based on a partial-band size a UE is configured to operating on.

14. The method of claim 1, wherein the PRG size is determined based on a numerology the UE is configured to operate with.

15. A method for wireless communications by a base station (BS), comprising:
    receiving signaling indicating a preferred precoding resource block group (PRG) size over which a user equipment (UE) can perform channel estimation jointly over all scheduled physical resource blocks (PRBs) within a PRG of that size; and
    communicating with the UE in accordance with the preferred PRG size.

16. The method of claim 15, wherein the indication comprises at least one of:
    an integer value of the preferred PRG size; or
    an indication of one of a set of PRG size values.

17. The method of claim 15, wherein:
    a number of PRBs are scheduled for a transmission from the base station to the UE; and
    a value of the indication indicates the preferred PRG size corresponds to all scheduled PRBs.

18. The method of claim 15, wherein the signaling is received in a channel state information (CSI) report.

19. The method of claim 15, wherein the signaling provides an indication of a preferred PRG size per CSI process or per layer.

20. The method of claim 15, further comprising receiving signaling indicating a preferred granularity for CSI reporting.

21. The method of claim 15, wherein signaling indicating a preferred PRG size is received periodically.

22. The method of claim 15, further comprising:
    sending a request to the UE; and
    receiving the signaling indicating the preferred PRG size in response to the request.

23. The method of claim 22, wherein the request indicates whether the preferred PRG size is to be based on wideband or a narrowband.

24. The method of claim 22, wherein the request semi-statically schedules the UE to report preferred PRG sizes.

25. An apparatus for wireless communications by a user equipment (UE), comprising:
    means for determining a preferred precoding resource block group (PRG) size over which the UE can perform channel estimation jointly over all scheduled physical resource blocks (PRBs) within a PRG of that size;
    means for providing an indication of the preferred PRG size to the base station; and
    means for communicating with a base station in accordance with the preferred PRG size.

26. An apparatus for wireless communications by a base station (BS), comprising:
- means for receiving signaling indicating a preferred precoding resource block group (PRG) size over which a user equipment (UE) can perform channel estimation jointly over all scheduled physical resource blocks (PRBs) within a PRG of that size; and
- means for communicating with the UE in accordance with the preferred PRG size.

* * * * *